(12) United States Patent
Wang et al.

(10) Patent No.: US 11,901,775 B2
(45) Date of Patent: Feb. 13, 2024

(54) ROTOR, MOTOR, AND ELECTRIC VEHICLE

(71) Applicant: Huawei Digital Power Technologies Co., Ltd, Shenzhen (CN)

(72) Inventors: Jiangang Wang, Dongguan (CN); Quanming Li, Dongguan (CN); Tingyu Xie, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 17/472,998

(22) Filed: Sep. 13, 2021

(65) Prior Publication Data

US 2021/0408854 A1    Dec. 30, 2021

Related U.S. Application Data

(63) Continuation of application No. PCT/CN2020/083051, filed on Apr. 2, 2020.

(30) Foreign Application Priority Data

Jun. 27, 2019  (CN) .......................... 201910570394.7

(51) Int. Cl.
*H02K 1/32*       (2006.01)
*B60K 1/00*       (2006.01)
(Continued)

(52) U.S. Cl.
CPC .................. *H02K 1/32* (2013.01); *B60K 1/00* (2013.01); *B60K 17/08* (2013.01); *H02K 1/28* (2013.01); *B60K 2001/006* (2013.01)

(58) Field of Classification Search
CPC .... B60K 17/08; B60K 1/00; B60K 2001/006; H02K 9/19; H02K 1/32; H02K 1/28; H02K 7/006; Y02T 10/64
(Continued)

(56) References Cited

U.S. PATENT DOCUMENTS 3,629,628 A * 12/1971 Rank ...................... H02K 9/193
                                                    310/211
6,897,581 B2 * 5/2005 Doherty ................... H02K 9/19
                                                    310/59
(Continued)

FOREIGN PATENT DOCUMENTS

CN        101305510 A      11/2008
CN        103812244 A       5/2014
(Continued)

OTHER PUBLICATIONS

European Search Report issued in corresponding European Application No. 20831805.5, dated Feb. 21, 2022, pp. 1-8.
(Continued)

*Primary Examiner* — Alex W Mok
(74) *Attorney, Agent, or Firm* — HAUPTMAN HAM, LLP

(57) ABSTRACT

A rotor includes a rotor iron core, a rotor shaft, and a fastening plate. The rotor iron core includes a first and a second end, and extends along an axial direction. The first fastening plate is fastened to at least the first or second end, and includes a through hole and a first runner. An inlet of the first runner communicates with the through hole. An outlet of the first runner is on a surface of a side of the fastening plate. The rotor shaft includes a second runner and a third runner in the rotor shaft. An inlet of the second runner is at one end of the at least one end of the rotor shaft. An outlet of the second runner communicates with an inlet of the third runner. An outlet of the third runner communicates with the inlet of the first runner.

12 Claims, 7 Drawing Sheets

(51) Int. Cl.
  *B60K 17/08* (2006.01)
  *H02K 1/28* (2006.01)
(58) Field of Classification Search
  USPC .......................................................... 310/54
  See application file for complete search history.

(56) References Cited

U.S. PATENT DOCUMENTS

| | | | | |
|---|---|---|---|---|
| 8,492,941 | B2* | 7/2013 | Endo | H02K 1/32 |
| | | | | 310/59 |
| 8,928,195 | B2* | 1/2015 | Ohashi | H02K 1/32 |
| | | | | 310/58 |
| 10,084,359 | B2* | 9/2018 | Kiyokami | H02K 9/19 |
| 2004/0221879 | A1 | 11/2004 | Tanabe et al. | |
| 2009/0261667 | A1* | 10/2009 | Matsubara | H02K 1/2766 |
| | | | | 310/54 |
| 2011/0169353 | A1* | 7/2011 | Endo | H02K 9/19 |
| | | | | 310/59 |
| 2012/0025642 | A1 | 2/2012 | Onimaru et al. | |
| 2013/0038151 | A1* | 2/2013 | Ohashi | H02K 5/1737 |
| | | | | 310/59 |
| 2016/0156251 | A1 | 6/2016 | Sakurai et al. | |
| 2016/0322876 | A1 | 11/2016 | Horii et al. | |
| 2018/0287464 | A1 | 10/2018 | Sung et al. | |
| 2019/0181724 | A1* | 6/2019 | Nakamatsu | H02K 1/30 |
| 2019/0190350 | A1* | 6/2019 | Ito | F16H 57/043 |
| 2020/0036248 | A1* | 1/2020 | Krais | H02K 1/2766 |

FOREIGN PATENT DOCUMENTS

| | | |
|---|---|---|
| CN | 205911849 U | 1/2017 |
| CN | 106849509 A | 6/2017 |
| CN | 208707441 U | 4/2019 |
| CN | 110380545 A | 10/2019 |
| JP | 2006115650 A | 4/2006 |
| JP | 2011114987 A | 6/2011 |
| JP | 2011254574 A | 12/2011 |
| JP | 2016082628 A | 5/2016 |
| WO | 2010119556 A1 | 10/2010 |
| WO | 2015107679 A1 | 7/2015 |
| WO | 2018030218 A1 | 2/2018 |

OTHER PUBLICATIONS

Japanese Office Action issued in corresponding Japanese Application No. 2021-556328, dated Oct. 25, 2022, pp. 1-13.
International Search Report issued in corresponding International Application No. PCT/CN2020/083051, dated Jul. 6, 2020, pp. 1-4.
Chinese Office Action issued in corresponding Chinese Application No. 201910570394.7, dated Mar. 4, 2020, pp. 1-8.
Japanese Notice of Allowance issued in corresponding Japanese Application No. 2021-556328, dated Apr. 18, 2023, pp. 1-3.

* cited by examiner

ROTOR, MOTOR, AND ELECTRIC VEHICLE

CROSS-REFERENCE TO RELATED APPLICATIONS

This application is a continuation of International Application No. PCT/CN2020/083051, filed on Apr. 2, 2020, which claims priority to Chinese Patent Application No. 201910570394.7, filed on Jun. 27, 2019, the disclosures of the aforementioned applications are hereby incorporated by reference in their entireties.

TECHNICAL FIELD

This application relates to the field of mechanical equipment technologies, and in particular, to a rotor, a motor, and an electric vehicle.

BACKGROUND

In some approaches, motors use a water cooling heat dissipation technology for heat dissipation. However, a power density of water cooling heat dissipation is comparatively low, and cooling water cannot be in direct contact with motor components because the cooling water does not have an insulation property, resulting in a comparatively high link thermal resistance of a cooling passage and a poor heat dissipation effect. In addition, the water cooling heat dissipation technology has a comparatively high requirement for structural precision of the motor components. Consequently, both manufacturing costs and time costs of the motors increase accordingly. To overcome the foregoing problems, some motors currently begin to use oil cooling heat dissipation to replace water cooling heat dissipation. For an existing motor using an oil cooling heat dissipation technology, at an end portion of a rotor of the motor, a cooling passage configured for dissipating heat for the end portion is disposed. Coolant oil flows in the cooling passage as the rotor rotates, and finally sprays from the cooling passage when being pushed by a centrifugal force generated when the rotor rotates, to implement heat dissipation. However, when the motor operates at a low speed, a core loss of the rotor is comparatively low, and a limited amount of heat is generated. Therefore, there is no need to perform heat dissipation for the rotor. In this case, if the rotor still drives the coolant oil to flow and causes the coolant oil to spray when the rotor rotates, part of kinetic energy of the motor is lost.

SUMMARY

This application provides a rotor, a motor, and an electric vehicle, to reduce a kinetic energy loss of the motor while implementing effective heat dissipation for the rotor, in accordance with some embodiments.

According to a first aspect, this application provides a rotor. The rotor includes a rotor iron core and a rotor shaft. The rotor iron core is a cylindrical structure. Along an axial direction of the rotor iron core, the rotor iron core includes a first end and a second end whose positions are opposite. A fastening plate is fastened to at least one of the first end and the second end. The fastening plate may be configured to fasten a silicon steel sheet of the rotor iron core, and may be further configured to correct dynamic balance of the rotor when the rotor rotates, so that the rotor can operate safely and reliably. The rotor shaft is securely fitted in the rotor iron core, and at least one end of the rotor shaft extends to the outside of the rotor iron core through a through hole disposed in the corresponding fastening plate. To implement heat dissipation for the rotor, a cooling passage is disposed in the rotor. When the cooling passage is arranged, a first runner is disposed in the fastening plate, an inlet of the first runner communicates with the through hole, and an outlet of the first runner is disposed on a surface of a circumferential side of the fastening plate; a second runner is disposed in the rotor shaft, and the second runner is disposed along an axial direction of the rotor shaft; and in addition, a third runner is disposed in the rotor shaft at least at one of positions corresponding to the through hole. The third runner is disposed along a radial direction of the rotor shaft. An inlet of the second runner is disposed at one end of the rotor shaft, an outlet of the second runner communicates with an inlet of the third runner, and an outlet of the third runner communicates with the inlet of the first runner. In this way, the second runner, the third runner, and the first runner communicate sequentially, thereby forming the cooling passage of the rotor. Pushed by a centrifugal force generated when the rotor rotates, coolant oil in the first runner tends to flow from the inlet of the first runner to the outlet of the first runner. When the coolant oil arrives at the outlet of the first runner and sprays, heat at an end portion of the rotor iron core can be taken away, thereby dissipating heat for the end portion of the rotor iron core. During specific disposing, the first runner may be designed as a damping runner. In this way, when the rotor rotates at a low speed, there is no need to perform proactive heat dissipation due to a comparatively small amount of generated heat, and a damping characteristic of the first runner can prevent a flowing tendency of the coolant oil cause by the centrifugal force, thereby reducing a kinetic energy loss of a motor. When the rotor rotates at a high speed, the centrifugal force acting on the coolant oil is comparatively large, and therefore, the coolant oil can overcome a flowing resistance in the first runner, and flow in the first runner and spray from the outlet of the first runner, thereby dissipating heat for the end portion of the rotor iron core.

In the rotor provided in some embodiments of this application, the first runner is a damping runner. This can not only reduce a kinetic energy loss occurring when the rotor rotates at a low speed, but also ensure effective heat dissipation for the rotor rotating at a high speed, thereby further increasing a maximum rotational speed of the rotor and prolonging duration of a peak power at a high rotational speed.

During specific disposing, the first runner may be designed to be in a plurality of structural forms, provided that the first runner can be enabled to resist flowing.

For example, in some embodiments, the first runner may be designed as a slender hole. A damping effect of the slender hole is used to increase a flowing resistance when the coolant oil flows.

For another example, in some embodiments the first runner may be designed as a bent runner. A damping effect generated by the bent runner is used to increase a flowing resistance when the coolant oil flows.

In some embodiments, the first runner may be designed as a bent slender hole, to further improve a damping effect of the first runner.

To further improve structural stability of the rotor iron core and improve a heat dissipation effect for the end portions of the rotor iron core, in some embodiments of this application, the fastening plates may be separately fastened to the first end and the second end of the rotor iron core.

In some embodiments of this application, a fourth runner may be further disposed on an inner wall of the rotor iron core, to dissipate heat for the inner wall on which the rotor iron core and the rotor shaft fit together. During specific disposing, the fourth runner is disposed along the axial direction of the rotor iron core and extends from the first end of the rotor iron core to the second end of the rotor iron core, an inlet of the fourth runner communicates with the first runner in the fastening plate fastened to the first end, and an outlet of the fourth runner communicates with the first runner in the fastening plate fastened to the second end. In this way, after the coolant oil enters the first runner, a portion of the coolant oil enters the fourth runner due to a pressure difference, and flows to the outlet of the fourth runner from the inlet of the fourth runner, thereby dissipating heat for the inner wall on which the rotor iron core and the rotor shaft fit together.

In some embodiments, there may be a plurality of fourth runners, to improve a heat dissipation effect for the inner wall of the rotor iron core. In addition, when the plurality of fourth runners are evenly distributed on the inner wall of the rotor iron core, heat dissipation uniformity can be further improved for the inner wall of the rotor iron core.

In some embodiments, a fifth runner may be alternatively disposed between the inner wall and an outer wall of the rotor iron core, to dissipate heat for an interior of the rotor iron core. During specific disposing, the fifth runner is disposed along the axial direction of the rotor iron core and extends from the first end of the rotor iron core to the second end of the rotor iron core, an inlet of the fifth runner communicates with the first runner in the fastening plate fastened to the first end, and an outlet of the fifth runner communicates with the first runner in the fastening plate fastened to the second end. In this way, after the coolant oil enters the first runner, a portion of the coolant oil enters the fifth runner due to a pressure difference, and flows to the outlet of the fifth runner from the inlet of the fifth runner, thereby dissipating heat for the interior of the rotor iron core.

In some embodiments, there may be a plurality of fifth runners, to improve a heat dissipation effect for the interior of the rotor iron core. In addition, when the plurality of fifth runners are evenly distributed in the rotor iron core, heat dissipation uniformity can be further improved for the interior of the rotor iron core.

After the coolant oil enters the fourth runner or the fifth runner, to enable the coolant oil to smoothly flow into the first runner in the fastening plate fastened to the second end from the outlet of the fourth runner or the fifth runner, a flowing resistance in the first runner in the fastening plate fastened to the first end may be designed to be greater than a flowing resistance in the first runner in the fastening plate fastened to the second end.

During specific disposing, in some embodiments, the first runner in the fastening plate fastened to the first end may be made to have a first length-to-diameter ratio, and the first runner in the fastening plate fastened to the second end may be made to have a second length-to-diameter ratio. When the first length-to-diameter ratio is greater than the second length-to-diameter ratio, the flowing resistance in the first runner in the fastening plate fastened to the first end can be made greater than the flowing resistance in the first runner in the fastening plate fastened to the second end.

In some embodiments, the first runner in the fastening plate fastened to the first end may be made to have m bent sections, and the first runner in the fastening plate fastened to the second end may be made to have n bent sections. When m>n, the flowing resistance in the first runner in the fastening plate fastened to the first end can be made greater than the flowing resistance in the first runner in the fastening plate fastened to the second end.

In some embodiments, to further promote flowing of the coolant oil in the fourth runner or the fifth runner, the third runner is disposed in the rotor shaft only at a position corresponding to the fastening plate fastened to the first end, and no third runner is disposed at a position corresponding to the fastening plate fastened to the second end, to reduce a possibility that the coolant oil flows reversely in the fourth runner or the fifth runner, thereby improving a heat dissipation effect.

In some embodiments, when the first runner is disposed, the first runner may be a groove-shaped runner disposed on an end face of the fastening plate. It may be understood that the end face is an end face on which the fastening plate fits with the first end or the second end of the rotor iron core. When the fastening plate is fastened to and pressed against the first end or the second end of the rotor iron core, the groove-shaped runner can be sealed by the first end or the second end of the rotor iron core.

In some embodiments, the first runner may be a hole-shaped runner disposed inside the fastening plate. When the first runner is disposed inside the fastening plate, to facilitate processing, the fastening plate may be designed as a laminated structure formed by stacking a first sub-plate and a second sub-plate. Then, on each sub-plate, a groove is disposed on an end face that is of the sub-plate and that faces the other sub-plate. The first runner is formed after the two sub-plates are stacked with their groove positions opposite to each other.

In some embodiments, a plurality of first runners may be designed, and the plurality of first runners may be evenly distributed in the fastening plates, to improve a heat dissipation effect and heat dissipation uniformity for the end portions of the rotor iron core.

In some embodiments the fastening plate is a laminated structure, when the fourth runner is made to communicate with the first runners in the fastening plates on two sides, for each fastening plate, a groove may be disposed on the sub-plate that is of the fastening plate and that is close to the rotor iron core, one end of the groove is made to communicate with the first runner, and the other end of the groove is made to communicate with the fourth runner.

In some embodiments, when the fifth runner is made to communicate with the first runners in the fastening plates on two sides, for each fastening plate, a hole may be disposed on the sub-plate that is of the fastening plate and that is close to the rotor iron core, one end of the hole is made to communicate with the first runner, and the other end of the hole is made to communicate with the fifth runner.

In some embodiments, a diameter of the fastening plate is not greater than a diameter of the rotor iron core, to facilitate subsequent assembly of the entire motor.

According to a second aspect, this application further provides a motor. The motor includes a stator and the rotor in any possible implementation solution in the first aspect. The stator includes a stator iron core and a stator coil. During specific disposing, the stator iron core is cylindrical in shape, and there are a plurality of tooth portions disposed on an inner wall of the stator iron core along an axial direction. The stator coil is disposed by winding around these tooth portions, and the stator coil has coil end portions protruding from two ends of the stator iron core. The rotor is rotatably fitted in the stator iron core, and the two fastening plates of the rotor separately protrude from the two ends of the stator iron core, so that the outlets that are of the first runners and that are disposed on the surfaces of the circumferential sides of the fastening plates are disposed toward the coil end portions. In this way, when the rotor rotates at a high speed, coolant oil may spray toward the coil end portions from the outlets of the first runners, to dissipate heat for the coil end portions.

In some embodiments, the motor may further include a housing configured to accommodate the stator and the rotor, and the stator iron core may be interference-fitted in the housing, so that the stator and the rotor can maintain fastened in the housing.

According to a third aspect, this application further provides an electric vehicle. The electric vehicle includes the motor in any implementation solution in the second aspect, and further includes a transmission device and driving wheels. The motor is in transmission connection with the transmission device, to output a driving force to the transmission device. The transmission device is then in transmission connection with the driving wheels. In this way, the driving force can be further transferred to the driving wheels, to drive the electric vehicle to run. In this solution, because a kinetic energy loss of the motor can be reduced, power performance of the electric vehicle is improved.

DETAILED DESCRIPTION

To make the objectives, technical solutions, and advantages of this application clearer, the following further describes this application in detail with reference to the accompanying drawings.

Figure 1:
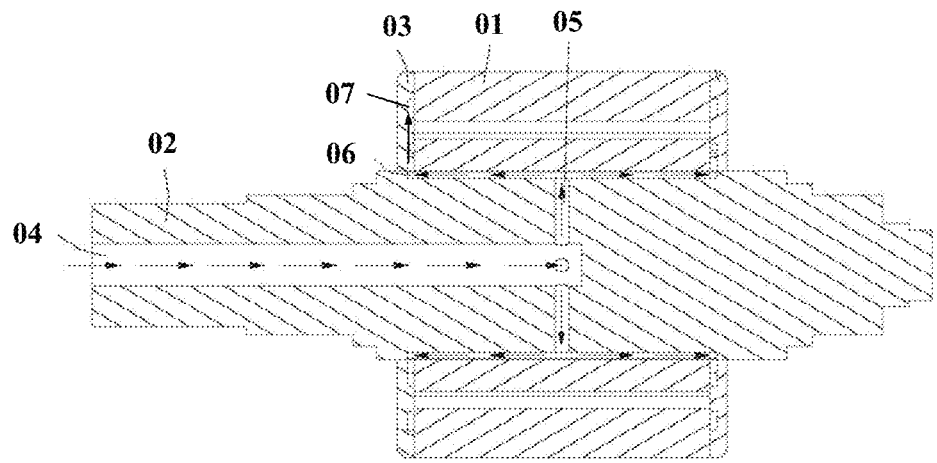
FIG. 1 is a schematic structural diagram of a rotor in some approaches.

To resolve problems occurring when a water cooling heat dissipation technology is used, such as a poor heat dissipation effect and a high requirement for structural precision, currently, some motors gradually use oil cooling heat dissipation to replace water cooling heat dissipation. A structure of a motor that uses an oil cooling heat dissipation technology and that is shown in FIG. 1 includes a rotor iron core 01 and a rotor shaft 02 that is securely fitted in the rotor iron core 01. In addition, fastening plates 03 are further separately disposed at two ends of the rotor iron core 01, and through holes allowing the rotor shaft to pass through are disposed in the fastening plates 03. When a cooling passage is arranged, a blind hole 04 is disposed on an end face of the rotor shaft 02 along an axial direction, and a through hole 05 extending from the blind hole 04 to a surface of a circumferential side of the rotor shaft 02 is disposed along a radial direction in the rotor shaft 02; a first groove 06 communicating with the through hole 05 is disposed on an inner wall of the rotor iron core 01, and the first groove 06 is disposed along an axial direction of the rotor iron core 01 and leads to the fastening plates 03 at the two ends; and a second groove 07 is disposed in the fastening plate 03 along a radial direction of the fastening plate 03, one end of the second groove 07 communicates with the first groove 06, and the other end of the second groove 07 leads to a surface of a circumferential side of the fastening plate 03. In this way, coolant oil flows into the blind hole 04 from an orifice of the blind hole 04, and then flows into the first groove 06 after flowing through the through hole 05, to dissipate heat for the inner wall of the rotor iron core 01. Then, the coolant oil flows into the second groove 07 from the first groove 06, and because being pushed by a centrifugal force generated when the rotor rotates, flows to the end that is of the second groove 07 and that is close to the surface of the circumferential side of the fastening plate 03 from the end that is of the second groove 07 and that is close to the first groove 06, to dissipate heat for an end portion of the rotor iron core 01. Finally, the coolant oil sprays from the surface of the circumferential side of the fastening plate 03. A defect of the oil cooling heat dissipation technology is as follows: Provided that the motor is in an operating state, the coolant oil flows in the cooling passage including the blind hole 04, the through hole 05, the first groove 06, and the second groove 07, and sprays from the surface of the circumferential side of the fastening plate 03. However, when the motor operates at a low speed, a core loss of the rotor is comparatively low, and an amount of generated heat is comparatively small. In this case, there is no need to perform heat dissipation for the end portion of the rotor iron core 01. If the rotor continues to drive the coolant oil to flow and causes the coolant oil to spray, part of kinetic energy of the motor is lost. Based on this, at least an embodiment of this application provides a rotor. For a motor using the rotor, a kinetic energy loss of the motor can be reduced while implementing effective heat dissipation for the rotor.

Figure 2:
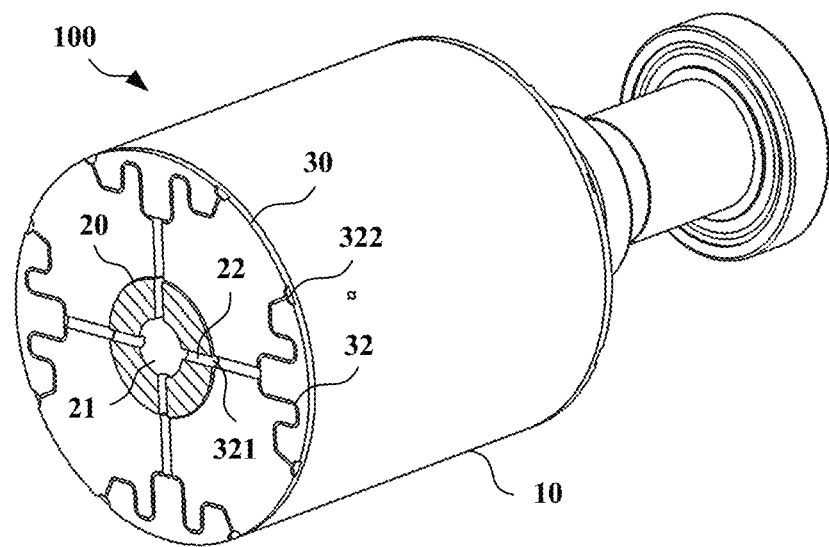
FIG. 2 is a schematic diagram of a partial structure of a rotor according to some embodiments of this application.
Figure 3:
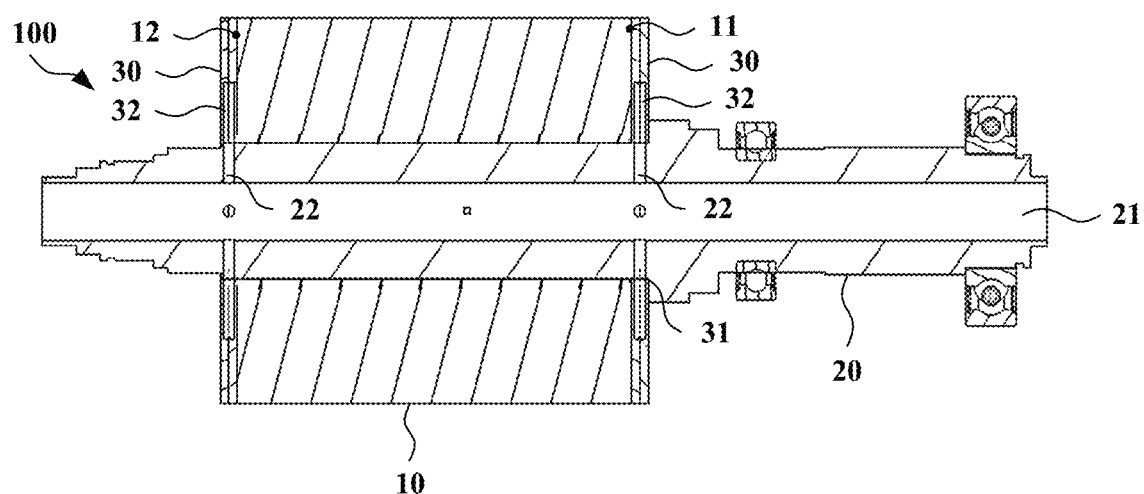
FIG. 3 is a cutaway view of the rotor according to some embodiments of this application.

First, as shown in FIG. 2 and FIG. 3, the rotor 100 provided in at least this embodiment of this application includes a rotor iron core 10 and a rotor shaft 20. The rotor iron core 10 is cylindrical in shape. Along an axial direction of the rotor iron core 10, the rotor iron core 10 includes a first end 11 and a second end 12 whose positions are opposite. The rotor shaft 20 is securely fitted in a cylindrical cavity of the rotor iron core 10, and two ends of the rotor shaft 20 separately extend to the outside of the rotor iron core 10 from the first end 11 and the second end 12. In some embodiments, during specific disposing, the rotor shaft 20 may be specifically interference-fitted in the rotor iron core 10 in a press-fitting manner, to ensure reliability of fitting between the rotor shaft 20 and the rotor iron core 10.

The rotor iron core 10 is formed by punching and laminating silicon steel sheets. To improve structural stability of the rotor iron core 10, a fastening plate 30 configured to fasten the silicon steel sheets is disposed at least one end of the rotor iron core 10. In addition, the fastening plate 30 may be further used to correct dynamic balance of the rotor when the rotor rotates, to enable the rotor to rotate more safely and stably. In some embodiments, during specific disposing, a diameter of the fastening plate 30 may be not greater than a diameter of the rotor iron core 10. For example, the diameter of the fastening plate 30 may be designed to be slightly less than the diameter of the rotor iron core 10, or designed to be equal to the diameter of the rotor iron core 10, to facilitate subsequent assembly of the entire motor. As shown in FIG. 3, a through hole 31 is disposed in the fastening plate 30, to enable at least one end of the rotor shaft 20 to extend to the outside of the rotor iron core 10 through the corresponding through hole 31. Certainly, to further improve structural stability of the rotor iron core 10 and improve a heat dissipation effect for end portions of the rotor iron core 10, in at least this embodiment of this application, the fastening plates 30 may be separately fastened to the first end 11 and the second end 12 of the rotor iron core 10.

Figure 4:
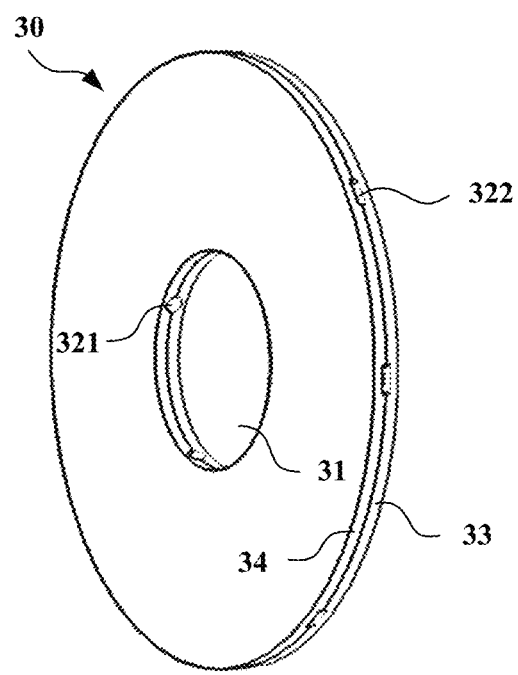
FIG. 4 is a schematic structural diagram of a fastening plate according to some embodiments of this application.
Figure 5:
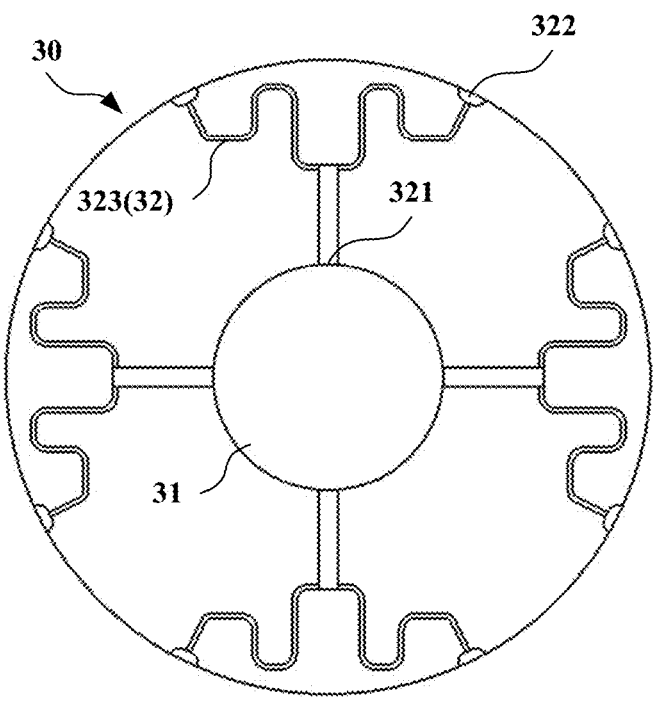
FIG. 5 is a cutaway view of the fastening plate according to some embodiments of this application.

In at least this embodiment of this application, a cooling passage configured for heat dissipation is disposed in the rotor 100. When the cooling passage is specifically arranged, as shown in FIG. 4 and FIG. 5, a first runner 32 is disposed in the fastening plate 30, an inlet 321 of the first runner communicates with the through hole 31 of the fastening plate 30, and an outlet 322 of the first runner is disposed on a surface of a circumferential side of the fastening plate 30. When being disposed, the first runner 32 may be disposed on an end face on which the fastening plate 30 fits with the end portion of the rotor iron core. In this case, the first runner 32 is actually a groove-shaped runner. When the fastening plate 30 is fastened to and pressed against the first end or the second end of the rotor iron core, the groove-shaped runner can be sealed by the first end or the second end of the rotor iron core. Certainly, the first runner 32 may be alternatively disposed inside the fastening plate 30, that is, disposed between two end faces of the fastening plate 30. In this case, the first runner 32 is a hole-shaped runner. It should be noted that when the first runner 32 is a hole-shaped runner, to facilitate processing, the fastening plate 30 may be designed as a laminated structure formed by stacking a first sub-plate 33 and a second sub-plate 34. Then, a groove 323 is disposed on each of an end face that is of the first sub-plate 33 and that faces the second sub-plate 34 and an end face that is of the second sub-plate 34 and that faces the first sub-plate 33. The first runner 32 is formed after the first sub-plate 33 and the second sub-plate 34 are stacked with positions of the two grooves 323 opposite to each other. As shown in FIG. 2 and FIG. 3, a second runner 21 is disposed in the rotor shaft 20, the second runner 21 is disposed along an axial direction of the rotor shaft 20, and an inlet of the second runner 21 is disposed at one end of the rotor shaft 20. In addition, a third runner 22 is disposed in the rotor shaft 20 at least at one of positions corresponding to the through hole 31. The third runner 22 is disposed along a radial direction of the rotor shaft 20, and is configured to enable the second runner 21 to communicate with the first runner 32. In this way, the second runner 21, the third runner 22, and the first runner 32 communicate sequentially, thereby forming the cooling passage of the rotor 100.

When heat dissipation is performed for the rotor 100 by using the cooling passage, as shown in FIG. 2 and FIG. 3, coolant oil flows into the second runner 21 from the inlet of the second runner 21, then enters the first runner 32 after flowing through the third runner 22, and in the first runner 32, tends to flow from the inlet 321 of the first runner to the outlet 322 of the first runner because being pushed by a centrifugal force generated when the rotor 100 rotates. When the coolant oil arrives at the outlet 322 of the first runner from the inlet 321 of the first runner and sprays from the outlet, heat at the end portion of the rotor iron core 10 can be taken away through direct or indirect contact with the end portion of the rotor iron core 10, thereby dissipating heat for the end portion of the rotor iron core 10.

When the motor operates at a low speed, a core loss of the rotor 100 is comparatively low, and an amount of generated heat is comparatively small. In this case, there is no need to perform proactive heat dissipation for the end portion of the rotor iron core 10. Therefore, in at least this embodiment of this application, the first runner 32 may be designed as a damping runner. In this way, when the rotor rotates at a low speed, the centrifugal force acting on the coolant oil is comparatively small, and a damping characteristic of the first runner 32 can prevent a flowing tendency of the coolant oil caused by the centrifugal force, and prevent the coolant oil from flowing in the first runner 32 and spraying, thereby reducing a kinetic energy loss of the motor. When the rotor 100 rotates at a high speed, the centrifugal force acting on the coolant oil is comparatively large, and therefore, the coolant oil can overcome a flowing resistance in the first runner 32, and flow in the first runner 32 and spray from the outlet of the first runner 32, thereby dissipating heat for the end portion of the rotor iron core. In other words, the first runner 32 is designed as the damping runner. This can not only reduce a kinetic energy loss occurring when the rotor 100 rotates at a low speed, but also ensure effective heat dissipation for the rotor 100 rotating at a high speed, thereby further increasing a maximum rotational speed of the motor and prolonging duration of a peak power at a high rotational speed. It should be noted that high-speed rotation or low-speed rotation of the rotor 100 herein is relative. In actual application, a critical rotational speed may be set based on heat generation of the rotor 100 during rotation. When a rotational speed of the rotor 100 is lower than the critical rotational speed, an amount of heat generated by the rotor 100 is comparatively small, and in this case, heat dissipation may not be performed for the end portion of the rotor iron core 10. When a rotational speed of the rotor 100 is higher than the critical rotational speed, an amount of heat generated by the rotor 100 is comparatively large, and in this case, heat dissipation is performed for the end portion of the rotor iron core 10. In this way, a flowing resistance in the first runner 32 can be designed based on the centrifugal force acting on the coolant oil when the rotor 100 rotates at the critical rotational speed.

During specific disposing, in some embodiments of this application, the first runner may be designed as a slender hole. A damping effect of the slender hole is used for increasing a flowing resistance when the coolant oil flows. It should be noted that a length-to-diameter ratio of the slender hole may be specifically designed based on the centrifugal force acting on the coolant oil when the rotor rotates at a low speed. A specific value of the length-to-diameter ratio is not limited in this application, provided that a flowing resistance generated by the slender hole can prevent the coolant oil from flowing in the first runner when the rotor is in a low-speed rotation state, and can be overcome by the centrifugal force acting on the coolant oil when the rotor is in a high-speed rotation state.

In some embodiments of this application, the first runner may be alternatively designed as a bent runner. A damping effect generated by the bent runner is used to increase a flowing resistance when the coolant oil flows. Likewise, a quantity of bent sections of the bent runner may also be designed based on the centrifugal force acting on the coolant oil when the rotor rotates at a low speed. This is not limited in this application.

Certainly, in some embodiments of this application, as shown in FIG. 5, the first runner 32 may be alternatively designed as a bent slender hole, to further ensure a damping effect of the first runner 32 when the rotor rotates at a low speed.

In the foregoing embodiments, there may be specifically two or more first runners 32, and during disposing, the two or more first runners 32 are evenly distributed in the fastening plate 30. In this way, not only a heat dissipation effect and heat dissipation uniformity can be improved for the end portion of the rotor iron core, but also a position of a center of gravity of the fastening plate 30 can be maintained near a center of the fastening plate 30, which helps the rotor rotate stably. Corresponding to the inlet 321 of each first runner 32, one outlet 322 may be disposed, or a plurality of outlets 322 may be disposed for each first runner 32. For example, as shown in FIG. 5, two outlets 322 are disposed for each first runner 32 on the surface of the circumferential side of the fastening plate 30. This can further increase a coverage area of the first runner 32, and improve a heat dissipation effect for the end portion of the rotor iron core.

It should be noted that when there are a plurality of first runners 32, correspondingly, as shown in FIG. 2, there are also a plurality of third runners 22 that are configured to enable the first runners 32 and the second runner 21 to communicate. In this case, the third runners 22 may also be evenly distributed in the rotor shaft 20 along a principal axis of the rotor shaft 20, to ensure stability of the rotor 100 during rotation.

Figure 6:
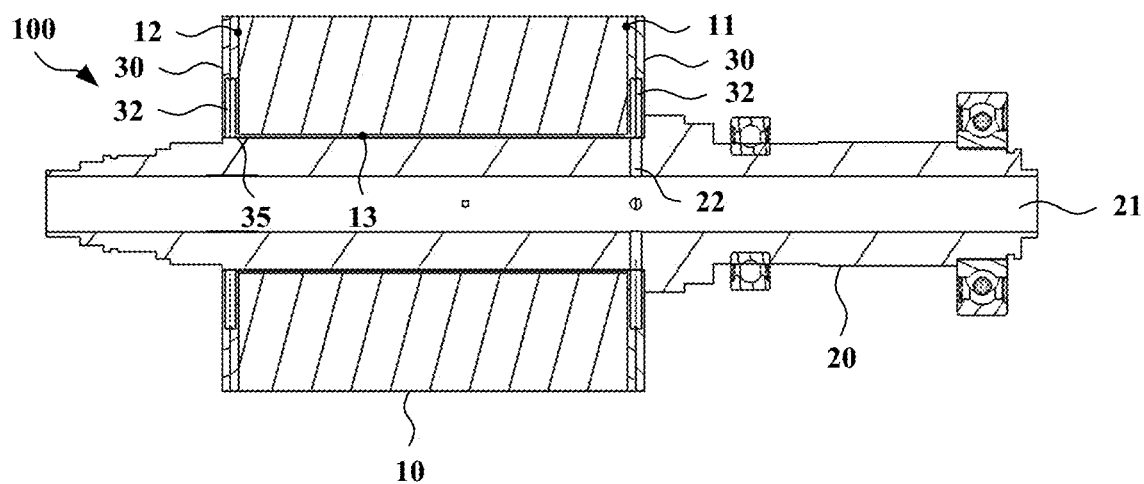
FIG. 6 is a cutaway view of a rotor according to some embodiments of this application.
Figure 7:
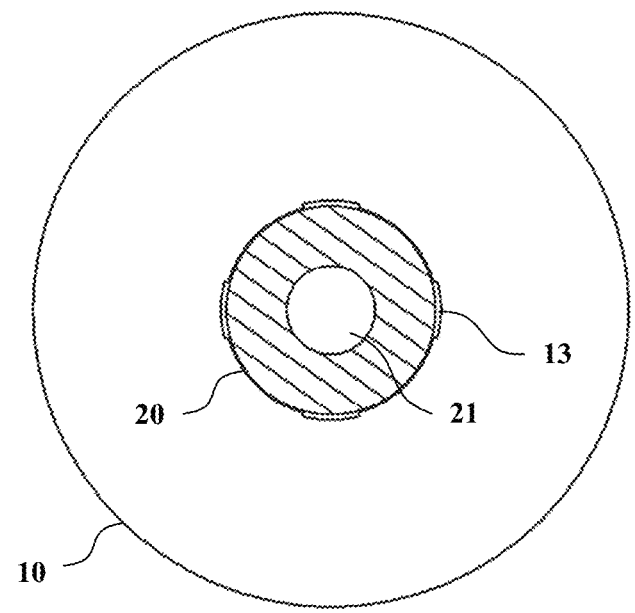
FIG. 7 is a cutaway view of an axial side of the rotor according to some embodiments of this application.

As shown in FIG. 6 and FIG. 7, an inner wall of a rotor iron core 10 has a fourth runner 13. The fourth runner 13 is disposed along the axial direction of the rotor iron core 10 and extends from a first end 11 of the rotor iron core 10 to a second end 12 of the rotor iron core 10. An inlet of the fourth runner 13 communicates with a first runner 32 in a fastening plate 30 fastened to the first end 11, and an outlet of the fourth runner 13 communicates with a first runner 32 in a fastening plate 30 fastened to the second end 12. It should be noted that in a case in which the fastening plate 30 is a laminated structure, when the fourth runner 13 is made to communicate with the first runners 32 in the fastening plates 30 on two sides, for each fastening plate 30, a groove 35 may be disposed on a sub-plate that is of the fastening plate 30 and that is close to the rotor iron core 10, one end of the groove 35 is made to communicate with the first runner 32, and the other end of the groove 35 is made to communicate with the fourth runner 13. In at least this embodiment, coolant oil flows into a second runner 21 from an inlet of the second runner 21, and then flows through a third runner 22 and enters the first runner 32 in the fastening plate 30. Further, when a rotor 100 rotates, due to a pressure difference, a portion of the coolant oil flows from the first runner 32 into the fourth runner 13 in which a pressure is comparatively low, and flows to the outlet of the fourth runner 13 from the inlet of the fourth runner 13, thereby dissipating heat for the inner wall on which the rotor iron core 10 and a rotor shaft 20 fit together. In addition, to improve a heat dissipation effect, a plurality of fourth runners 13 may be disposed on the inner wall of the rotor iron core 10. For example, in at least the embodiment shown in FIG. 7, there are four fourth runners 13, and the four first runners are evenly distributed on the inner wall of the rotor iron core 10.

To enable the coolant oil in the fourth runner 13 to flow from the outlet of the fourth runner 13 into the first runner 32 in the fastening plate 30 fastened to the second end 12, a flowing resistance in the first runner 32 corresponding to the first end 11 may be designed to be greater than a flowing resistance in the first runner 32 corresponding to the second end 12. Certainly, considering that there is also a specific flowing resistance in the fourth runner 13, to ensure a cooling effect, the flowing resistance in the first runner 32 corresponding to the first end 11 may actually be slightly greater than a sum of the flowing resistance in the first runner 32 corresponding to the second end 12 and the flowing resistance in the fourth runner 13.

During specific disposing, in some embodiments of this application, the flowing resistances in the first runners 32 in the two fastening plates 30 may be controlled by enabling the first runners 32 to use different length-to-diameter ratios. For example, the first runner 32 in the fastening plate 30 fastened to the first end 11 has a first length-to-diameter ratio, and the first runner 32 in the fastening plate 30 fastened to the second end 12 has a second length-to-diameter ratio. When the first length-to-diameter ratio is greater than the second length-to-diameter ratio, the flowing resistance in the first runner 32 in the fastening plate 30 fastened to the first end 11 can be made greater than the flowing resistance in the first runner 32 in the other fastening plate 30. The first length-to-diameter ratio and the second length-to-diameter ratio may be specifically set based on actual application. This is not limited in this application.

In some embodiments of this application, the flowing resistances in the first runners 32 in the two fastening plates 30 may be alternatively controlled by enabling the first runners 32 to have different quantities of bent sections. For example, the first runner 32 in the fastening plate 30 fastened to the first end 11 has m bent sections, and the first runner 32 in the fastening plate 30 fastened to the second end 12 has n bent sections. When m>n, the flowing resistance in the first runner 32 in the fastening plate 30 fastened to the first end 11 can be made greater than the flowing resistance in the first runner 32 in the other fastening plate 30. Both m and n are positive integers, and specific values of m and n may be specifically set based on actual application.

It may be understood that to further promote flowing of the coolant oil in the fourth runner 13, in at least this embodiment of this application, the third runner 22 is disposed in the rotor shaft 20 only at a position corresponding to the fastening plate 30 fastened to the first end 11, and no third runner 22 is disposed at a position corresponding to the fastening plate 30 fastened to the second end 12. In this case, a flowing path of the coolant oil is as follows: The coolant oil flows into the second runner 21 from the inlet of the second runner 21, and then flows through the third runner 22 and enters the first runner 32 in the fastening plate 30 fastened to the first end 11. One portion of the coolant oil entering the first runner 32 flows to an outlet of the first runner from an inlet of the first runner as the rotor 100 rotates, to dissipate heat for the first end 11 of the rotor iron core 10. Another portion of the coolant oil entering the first runner 32 flows into the fourth runner 13, flows to the outlet of the fourth runner 13 from the inlet of the fourth runner 13, to dissipate heat for the inner wall on which the rotor iron core 10 and the rotor shaft 20 fit together, then flows into the first runner 32 in the fastening plate 30 fastened to the second end 12 from the outlet of the fourth runner 13, and flows to an outlet of the first runner 32 from an inlet of the first runner 32 as the rotor 100 rotates, to dissipate heat for the second end 12 of the rotor iron core 10.

Figure 8:
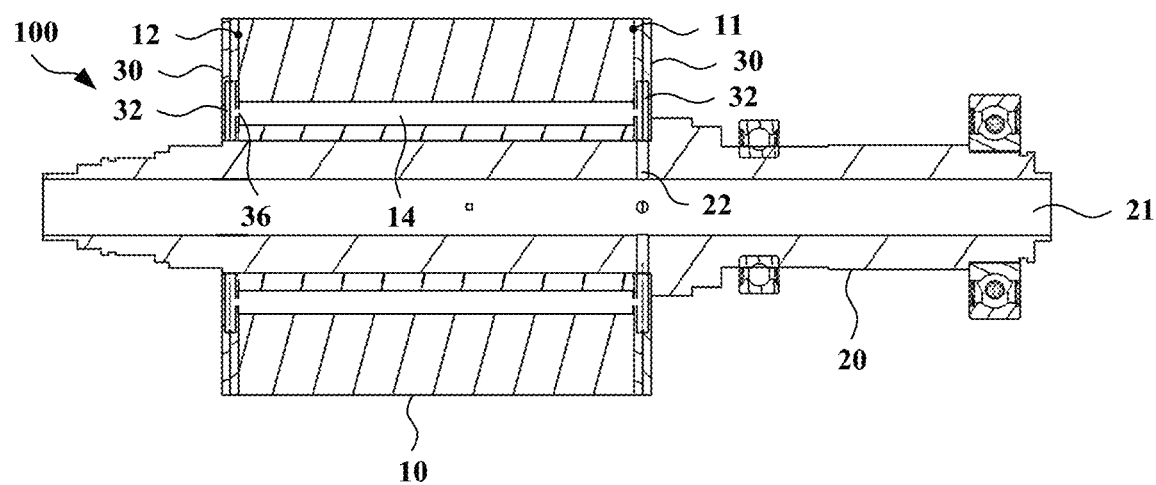
FIG. 8 is a cutaway view of a rotor according to some embodiments of this application.
Figure 9:
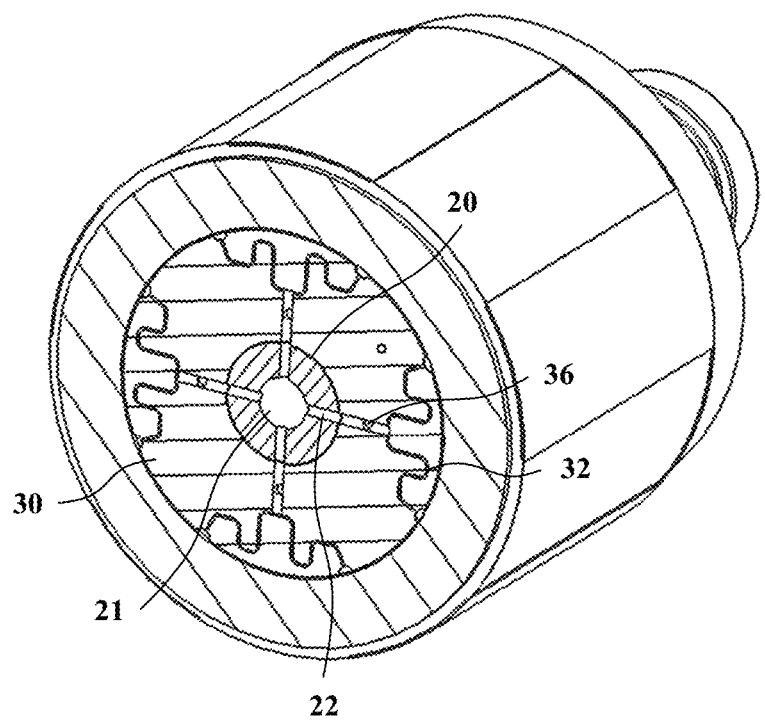
FIG. 9 is a schematic diagram of a partial structure of the rotor according to some embodiments of this application.

As shown in FIG. 8 and FIG. 9, a fifth runner 14 is disposed between an inner wall and an outer wall of a rotor iron core 10. The fifth runner 14 is also disposed along the axial direction of the rotor iron core 10 and extends from a first end 11 of the rotor iron core 10 to a second end 12 of the rotor iron core 10. An inlet of the fifth runner 14 communicates with a first runner 32 in a fastening plate 30 fastened to the first end 11, and an outlet of the fifth runner 14 communicates with a first runner 32 in a fastening plate 30 fastened to the second end 12. Likewise, in a case in which the fastening plate 30 is a laminated structure, when the fifth runner 14 is made to communicate with the first runners 32 in the fastening plates 30 on two sides, for each fastening plate 30, a hole 36 may be disposed on a sub-plate that is of the fastening plate 30 and that is close to the rotor iron core 10, one end of the hole 36 is made to communicate with the first runner 32, and the other end of the hole 36 is made to communicate with the fifth runner 14. In at least this embodiment, coolant oil flows into a second runner 21 from an inlet of the second runner 21, and then flows through a third runner 22 and enters the first runner 32 in the fastening plate 30. Further, when a rotor 100 rotates, due to a pressure difference, a portion of the coolant oil flows from the first runner 32 into the fifth runner 14 in which a pressure is comparatively low, and flows to the outlet of the fifth runner 14 from the inlet of the fifth runner 14, thereby dissipating heat for an interior of the rotor iron core 10. In addition, to improve a heat dissipation effect, a plurality of fifth runners 14 may be disposed in the rotor iron core 10. In some embodiments, during specific disposing, the plurality of fifth runners 14 may be evenly distributed in the rotor iron core, to improve heat dissipation uniformity for the interior of the rotor iron core.

Certainly, in at least the foregoing embodiment, to enable the coolant oil in the fifth runner 14 to flow from the outlet of the fifth runner 14 into the first runner 32 in the fastening plate 30 fastened to the second end 12, a flowing resistance in the first runner 32 corresponding to the first end 11 may also be designed to be greater than a flowing resistance in the first runner 32 corresponding to the second end 12. Considering that there is also a specific flowing resistance in the fifth runner 14, to ensure a cooling effect, the flowing resistance in the first runner 32 corresponding to the first end 11 may actually be slightly greater than a sum of the flowing resistance in the first runner 32 corresponding to the second end 12 and the flowing resistance in the fifth runner 14. In some embodiments, during specific disposing, with reference to the foregoing description, the flowing resistances in the first runners 32 in the two fastening plates 30 may be controlled by enabling the first runners 32 to use different length-to-diameter ratios or have different quantities of bent sections. Details are not described herein again.

In addition, to further promote flowing of the coolant oil in the fifth runner 14, in at least this embodiment of this application, the third runner 22 may also be disposed in a rotor shaft 20 only at a position corresponding to the fastening plate 30 fastened to the first end 11, and no third runner 22 is disposed at a position corresponding to the fastening plate 30 fastened to the second end 12. In this case, a flowing path of the coolant oil is as follows: The coolant oil flows into the second runner 21 from the inlet of the second runner 21, and then flows through the third runner 22 and enters the first runner 32 in the fastening plate 30 fastened to the first end 11. One portion of the coolant oil entering the first runner 32 flows to an outlet of the first runner 32 from an inlet of the first runner 32 as the rotor 100 rotates, to dissipate heat for the first end 11 of the rotor iron core 10. Another portion of the coolant oil entering the first runner 32 flows into the fifth runner 14, flows to the outlet of the fifth runner 14 from the inlet of the fifth runner 14, to dissipate heat for the interior of the rotor iron core 10, then flows into the first runner 32 in the fastening plate 30 fastened to the second end 12 from the outlet of the fifth runner 14, and flows to an outlet of the first runner 32 from an inlet of the first runner 32 as the rotor 100 rotates, to dissipate heat for the second end 12 of the rotor iron core 10.

In conclusion, in the rotor provided in some embodiments of this application, the first runner is designed as the damping runner. This can not only reduce a kinetic energy loss occurring when the rotor rotates at a low speed, but also ensure effective heat dissipation for the rotor rotating at a high speed, thereby further increasing a maximum rotational speed and prolonging duration of a peak power at a high rotational speed.

Figure 10:
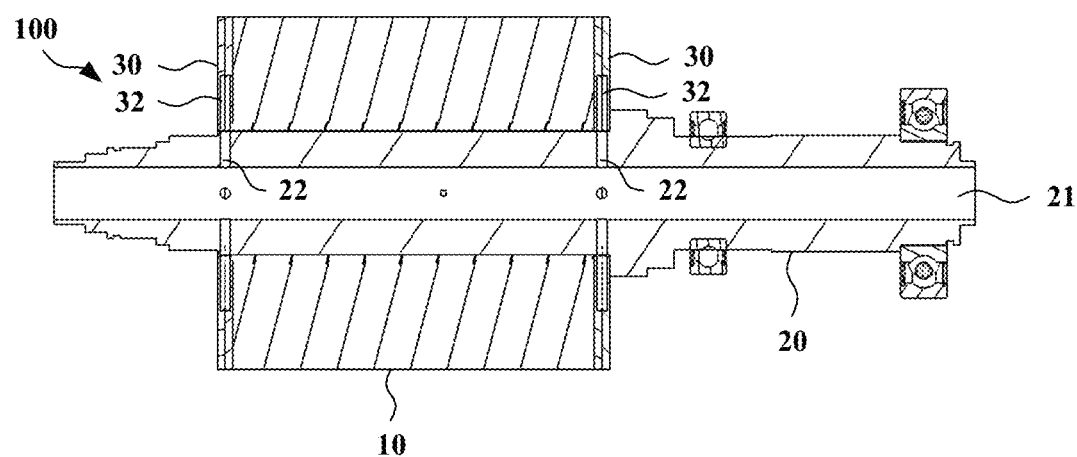
FIG. 10 is a cutaway view of a rotor according to some embodiments of this application.
Figure 11:
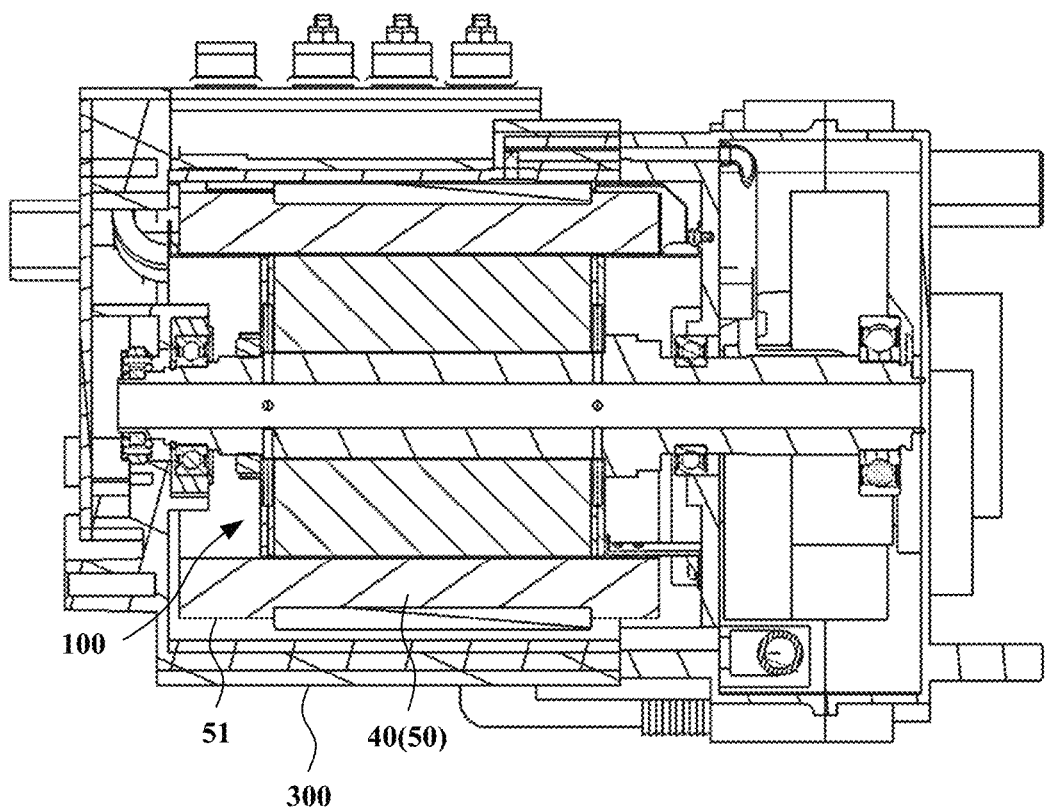
FIG. 11 is a cutaway view of a motor according to some embodiments of this application.
Figure 12:
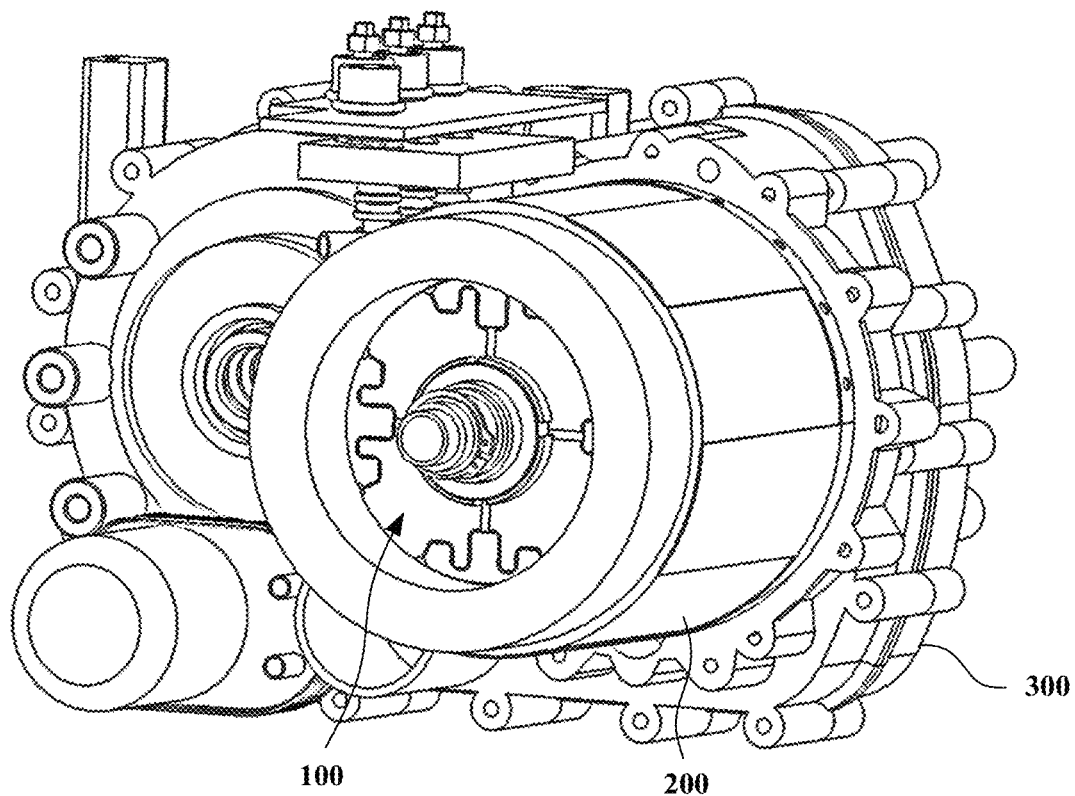
FIG. 12 is a schematic diagram of a partial structure of the motor according to some embodiments of this application; ands

In at least an embodiment of this application further provides a motor 1. The motor may be specifically applied to an electric vehicle, and serve as a power system of the electric vehicle to provide a driving force for driving of the electric vehicle. As shown in FIG. 11 and FIG. 12, the motor 1 includes a stator 200 and the rotor 100 provided in any one of the foregoing embodiments. In some embodiments, during specific disposing, the stator 200 includes a stator iron core 40 and a stator coil 50. The stator iron core 40 is cylindrical in shape, and there are a plurality of tooth portions disposed on an inner wall of the stator iron core 40 along an axial direction of the stator iron core 40. The stator coil 50 is disposed by winding around these tooth portions, and the stator coil 50 has coil end portions 51 protruding from two ends of the stator iron core 40. The rotor 100 is rotatably fitted in the stator iron core 40. As shown in FIG. 10, the two fastening plates 30 fastened to the two ends of the rotor iron core 10 separately extend beyond the two ends of the stator iron core 40, so that the outlets that are of the first runners 32 and that are disposed on the surfaces of the circumferential sides of the fastening plates 30 can be disposed toward the coil end portions 51. In this way, when the rotor 100 rotates at a high speed, coolant oil directly sprays toward the coil end portions 51 after spraying from the outlets of the first runners 32, to dissipate heat for the coil end portions 51. In addition, when the diameter of the fastening plate 30 is close or equal to the diameter of the rotor iron core 10, the outlet of the first runner 32 is closer to the coil end 51. In this case, oil can be precisely sprayed to the coil end portion 51, thereby improving a cooling effect for the coil end portion 51.

Still as shown in FIG. 12, the motor 1 further includes a housing 300 configured to accommodate the stator 200 and the rotor 100, and the stator iron core is interference-fitted in the housing 300, so that the stator 200 and the rotor 100 can maintain fastened between each other. In at least this embodiment of this application, the motor may further include a circulation pump and an oil storage tank. In addition, an oil return port communicating with the oil storage tank may be disposed on the housing. An oil inlet port of the circulation pump communicates with the oil storage tank, and an oil outlet port of the circulation pump communicates with the inlet of the second runner in the rotor shaft. After entering the cooling passage of the rotor to dissipate heat for corresponding components of the rotor, the coolant oil sprays from the outlet of the first runner to continue to dissipate heat for the coil end portion of the stator, and then collects in the housing and flows to the oil storage tank from the oil return port, to implement recycling.

Figure 13:
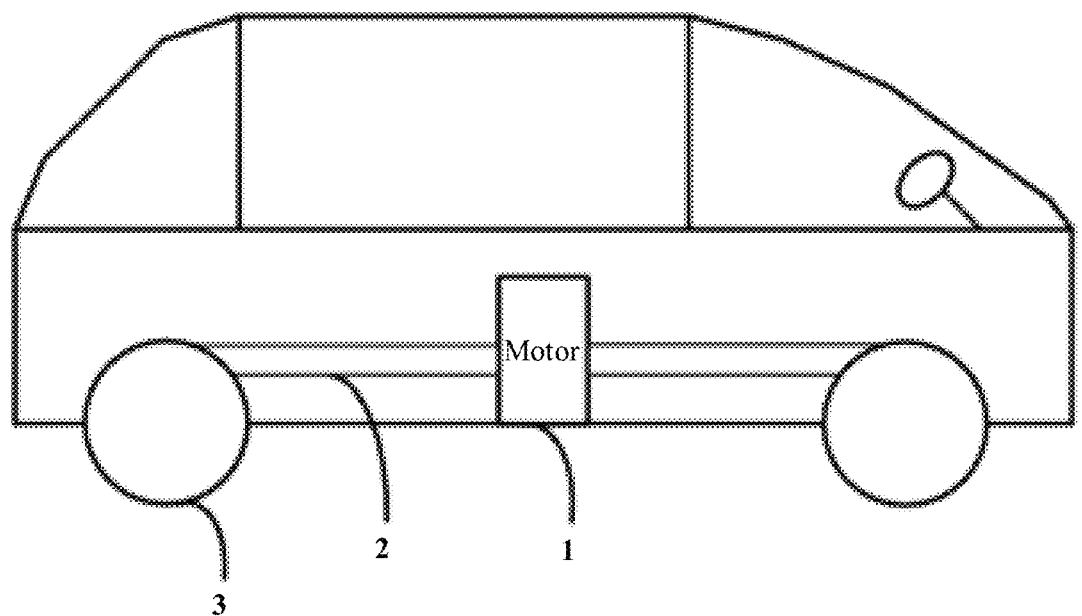
FIG. 13 is a schematic structural diagram of an electric vehicle according to some embodiments of this application.

As shown in FIG. 13, at least an embodiment of this application further provides an electric vehicle. The electric vehicle includes the motor 1 in the foregoing embodiments, and further includes a transmission device 2 and driving wheels 3. The motor 1 is in transmission connection with the transmission device 2, and the transmission device 2 is then in transmission connection with the driving wheels 3, so that a driving force output by the motor 1 can be transferred to the driving wheels 3 through the transmission device 2, to drive the electric vehicle to run. In at least this embodiment of this application, because a heat dissipation effect of the motor 1 is comparatively good, and a kinetic energy loss is reduced accordingly, power performance of the electric vehicle can be effectively improved.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A rotor, comprising a rotor iron core and a rotor shaft, wherein
    the rotor iron core is cylindrical in shape and has a first end and a second end along an axial direction, a fastening plate is fastened to at least one end of the rotor iron core, a through hole and a first runner are disposed in the fastening plate; the through hole is arranged along the axial direction of the rotor iron core, the first runner is a damping runner, an inlet of the first runner communicates with the through hole, and an outlet of the first runner is disposed on a surface of a circumferential side of the fastening plate;
    the rotor shaft is fitted in the rotor iron core, and at least one end of the rotor shaft extends to the outside of the rotor iron core from the through hole of the fastening plate; a second runner and a third runner are disposed in the rotor shaft, wherein the second runner is disposed along an axial direction, wherein the third runner is disposed along a radial direction at least at one of positions corresponding to the through hole; an inlet of the second runner is disposed at one end of the rotor shaft, an outlet of the second runner communicates with an inlet of the third runner, and an outlet of the third runner communicates with the inlet of the first runner; and
    the fastening plates are separately fastened to the first end and the second end, and a fourth runner is disposed on an inner wall of the rotor iron core along the axial direction of the rotor iron core and extends from the first end to the second end, an inlet of the fourth runner communicates with the first runner in the fastening plate fastened to the first end, and an outlet of the fourth runner communicates with the first runner in the fastening plate fastened to the second end,
    wherein at least one fastening plate of the fastening plates includes:
        a first sub-plate with a first groove; and
        a second sub-plate with a second groove, the first sub-plate contacts the second sub-plate thereby forming the first runner where the first groove and the second groove are positioned opposite of each other in the corresponding first sub-plate and the second sub-plate.

2. The rotor according to claim 1, wherein the first runner is a slender hole.

3. The rotor according to claim 1, wherein the first runner is bent in shape.

4. The rotor according to claim 1, wherein the fastening plates are separately fastened to the first end and the second end, and a fifth runner is disposed between an inner wall and an outer wall of the rotor iron core along the axial direction of the rotor iron core and extends from the first end to the second end, an inlet of the fifth runner communicates with the inlet of the first runner in the fastening plate fastened to the first end, and an outlet of the fifth runner communicates with the first runner in the fastening plate fastened to the second end.

5. The rotor according to claim 4, wherein the first runner in the fastening plate fastened to the first end has a first length-to-diameter ratio, the first runner in the fastening plate fastened to the second end has a second length-to-diameter ratio, and the first length-to-diameter ratio is greater than the second length-to-diameter ratio.

6. The rotor according to claim 4, wherein the first runner in the fastening plate fastened to the first end has m bent sections, the first runner in the fastening plate fastened to the second end has n bent sections, and both m and n are positive integers and m>n.

7. The rotor according to claim 4, wherein the third runner is disposed at a position corresponding to the fastening plate fastened to the first end in the rotor shaft.

8. The rotor according to claim 1, wherein there are at least two first runners for each fastening plate, and the at least two first runners are evenly distributed on the fastening plate.

9. The rotor according to claim 1, wherein a diameter of the fastening plate is not greater than a diameter of the rotor iron core.

10. A motor, comprising a stator and the rotor according to claim 1, wherein
    the stator comprises a stator iron core and a stator coil, wherein the stator iron core is cylindrical in shape, and there are a plurality of tooth portions disposed on an inner wall of the stator iron core along an axial direction, the stator coil is disposed by winding around the tooth portions, and the stator coil has coil end portions protruding from two ends of the stator iron core; and
    the rotor iron core is rotatably fitted in the stator iron core, and the two fastening plates separately protrude from the two ends of the stator iron core, and an outlet of a first runner is disposed toward the coil end portions.

11. The motor according to claim 10, further comprising a housing, wherein the stator iron core is fitted in the housing.

12. An electric vehicle, comprising the motor according to claim 10, a transmission device, and driving wheels, wherein the motor is in sequential transmission connection with the transmission device and the driving wheels, the transmission device is configured to transfer a driving force output by the motor to the driving wheels, and the driving wheels are configured to drive the electric vehicle to run.

* * * * *